United States Patent [19]

Schatz

[11] Patent Number: 5,341,428
[45] Date of Patent: Aug. 23, 1994

[54] MULTIPLE CROSS-CHECK DOCUMENT VERIFICATION SYSTEM

[75] Inventor: Vernon L. Schatz, Lake Bluff, Ill.

[73] Assignee: GBS Systems Corporation, Arlington Heights, Ill.

[21] Appl. No.: 828,134

[22] Filed: Jan. 30, 1992

[51] Int. Cl.⁵ .......................... H04L 9/32; H04L 9/06
[52] U.S. Cl. ........................ 380/23; 380/24;
  380/29; 340/825.31; 340/825.34; 235/379;
  235/380
[58] Field of Search ................. 380/4, 23, 24, 25, 49,
  380/50, 29, 55; 235/379–382; 340/825.31,
  825.34

[56] References Cited

U.S. PATENT DOCUMENTS

| | | | |
|---|---|---|---|
| 3,990,558 | 11/1976 | Ehrat | 340/825.34 X |
| 4,678,896 | 7/1987 | Carlson et al. | 235/380 |
| 4,748,668 | 5/1988 | Shamir et al. | 380/30 |
| 4,758,714 | 7/1988 | Carlson et al. | 235/380 |
| 4,812,632 | 3/1989 | Kakinuma et al. | 235/479 |
| 4,849,613 | 7/1989 | Eisele | 235/379 |
| 4,879,455 | 11/1989 | Butterworth et al. | 235/380 |
| 4,912,308 | 3/1990 | Takahira | 235/379 |
| 5,010,237 | 4/1991 | Kawana | 235/379 |

Primary Examiner—Bernarr E. Gregory
Attorney, Agent, or Firm—Burns, Doane, Swecker & Mathis

[57] ABSTRACT

A check or other document verification method in which a data encryption algorithm is applied to personal identification number (PIN) and selected other information particular to each document such as check number or amount of check. The resulting derivation is printed on the face of the document at the time the document is originated, in human readable form and possibly in machine readable form. The recipient of the document is issued a proprietary card, preferably an integrated circuit or "smart card", which contains an identical algorithm to that used when the document was originated. When the document holder presents a check for cashing or otherwise presents a document for verification, the cardholder is first identified with the card by inserting the card in a terminal and manually entering a PIN as is a common practice. Then the person who was given the document for validation, such as a check cashier, enters the selected information from the face of the document, which is processed utilizing the previously entered PIN and the algorithm from the card to derive a number. The number thus derived may be compared to the derivation which was printed on the document, visually or automatically by incorporating the capability within the terminal for reading the derived number from the face of the document. The proposed method thus validates the cardholder as the legitimate holder of the card, the cardholder as the legitimate holder of the document, and the document as having been legitimately produced for the specific cardholder.

13 Claims, 7 Drawing Sheets

Eligibility Information

MULTIPLE CROSS-CHECK DOCUMENT VERIFICATION SYSTEM

BACKGROUND OF THE INVENTION

The present invention relates to document verification systems and more particularly to a virtually foolproof document verification system employing multiple cross-checks. The system may be used in connection with paper instruments, such as checks, security documents, ambassadors' pouches and the contents thereof, etc.

The fraudulent misuse of documents has, in the past, been limited only by the ingenuity of those attempting such misuse. In the case of payroll checks, blank checks may be stolen from an employer, completed, and presented for payment. Already-completed checks may also be illegally obtained either before or after distribution to a recipient. Although the frequency of such occurrences is low, when they do occur, the amount involved may be quite high, because the perpetrators are often professional criminals. The cost of guarding against the possibility of checks being stolen is high because of the extraordinary precautions which must be taken during handling and storage.

Government checks including welfare and social security checks present a particular and somewhat different problem. Recipients of government checks often have difficulty finding someone to cash their checks. Check cashing locations may be few in number, inconveniently located, and inordinately expensive in terms of the service fee charged. These types of checks quite often do not lend themselves to automatic deposit in financial institutions, particularly in the case of welfare checks, because the amounts involved are too small and the retention period of the funds is too short to encourage banks to establish demand deposit accounts (DDA) for welfare recipients. Retailers are often reluctant to cash government checks because of the risk of stolen, forged, or falsified checks, and because the checks may be returned as invalid at any time for a period of up to one year, which makes recovery all but impossible.

There are many check authorization programs currently in use, many of which are applied at the point of sale. In the best of cases, these may be based on a magnetic stripe identification card carried by an individual which is used to access a computer database either directly or through a data communications network. The database provides information regarding the eligibility of the individual to receive funds but has little or no capability of determining authenticity of the check being presented or the validity of the relationship between the individual and the check. The database would normally include check cashing parameters for the individual, such as size and frequency of check cashing privileges, and any one or a combination of several types of identifiers. Although such check authorization systems are loosely referred to as "check verification systems", this term is a misnomer in that the authenticity of the checks is not verified, rather the eligibility of the individuals is. Unlike paper checks, however, the individuals involved are of course not subject to the check clearing process or subject to return when fraud is discovered. Certainly, a visual verification of some sort may be made of the physical check such as looking for water-marked paper, unusual check numbering schemes, and foul-ups such as misspellings, illegibility and ink smudges. But professional and semi-professional criminals make few such mistakes.

When private check cashers such as currency exchanges cash checks, they look for obvious discrepancies, try to identify the individual (perhaps from past acquaintance) and then cash the check for a fee. Because validation, strictly speaking, is lacking or non-existent, the fee must be structured to allow for significant losses, and is often in the range of one to several dollars each for checks that may well be for a few hundred dollars or less. Whatever the fee is, it is a significant percentage of the face value of the check and is imposed on individuals whose options are few, if any. The truly needy and the legitimately entitled suffer not only from the acts of the dishonest, but also from the weakness of the system.

An object of the present invention, therefore, is to provide a more fool-proof document verification system. Another object of the present invention is to provide a document verification system having multiple cross-checks.

SUMMARY OF THE INVENTION

According to the document (e.g., check) verification and transaction method of the present invention, a payee of a check is identified by a personal identification number (PIN). A data encryption algorithm is applied to the PIN to produce a first number that is recorded on the check. Afterward, a PIN is ascertained from a bearer of the check, and the same data encryption algorithm is applied to the PIN as ascertained from the bearer to produce a second number. The first and second numbers are compared, and an indication is produced if the first and second numbers do not coincide. Further, according to the present invention, the data encryption algorithm, instead of being applied to the PIN alone, is applied to the PIN and to a further number together to produce the first number, the further number also being recorded on the check. Advantageously, the further number may be a check sequence number or an amount of the check.

More particularly, the method of the present invention validates the authenticity of the check being presented for payment, the eligibility of the individual presenting the check, and the validity of the relationship between the two. Although the method may be applied across a broad range of types of checks, it is most useful for checks that are disbursed on a regular basis to individuals. Briefly, the authenticity of the check being presented for payment is validated by means of a "check derivation" number printed on the front of the check at the time of issue and computed from the PIN of the named payee and a secondary key, also printed on the front of the check. The eligibility of the individual presenting the check is validated by means of eligibility information to be read by the person cashing the check and stored on a card, preferably an integrated circuit card, or "smart card". The validity of the relationship between the check being presented for payment and the individual presenting the check is also verified by means of the check derivation, since the individual presenting the check must be capable of entering the PIN of the named payee of the check in order for the check derivation to be correctly and independently produced by a transaction terminal at the point of use.

BRIEF DESCRIPTION OF THE DRAWINGS

These and other features and advantages of the invention will be readily apparent to one of ordinary skill in the art from the following written description, read in conjunction with the drawings, in which:

FIG. 6, including

DETAILED DESCRIPTION OF THE PREFERRED EMBODIMENTS

As previously suggested, the present invention advantageously authenticates a document (e.g., check) being presented, validates the relationship between the check and the individual presenting it, and validates the eligibility of the individual to receive funds. For the latter purpose, every prospective payee is issued a card, preferably an integrated circuit card, or "smart card". At the time of issue, the payee will elect or will be assigned a personal identification number (PIN). As an alternative, a digitized biometric identifier may be used such as voice print, iris print, fingerprint, or handwriting dynamics. For purposes of the present discussion, it will be assumed that the PIN alternative has been chosen. The PIN is to be known only to the payee and will be stored in a highly secured portion of the central computer files of the issuer.

Once the payee's PIN has been determined, he/she will be provided with a smart card. The card will include as much data as is reasonably available regarding the payee's check receipt eligibility including frequency of receipt and anticipated minimum/maximum range. A date through which the card is to be considered valid will be included in the card, thereby requiring periodic renewal. This measure will limit possible exposure to usage beyond periods of legitimate eligibility or employment. Also contained in the smart card will be an algorithm for computing a unique number. The identical algorithm will be stored in the issuer's secured computer file and will be protected against unauthorized use.

The identical algorithm is therefore stored in both the issuer's computer and the payee's smart card. Both algorithms produce the same number only in response to the same PIN, providing the basis for check verification according to the present invention. Since the card is portable, the algorithm is therefore available at a remote point of use.

The use of a PIN in conjunction with an algorithm is well-known in the art. A PIN is entered into a computer processor (e.g., IC card, terminal or main frame) and is processed by the computer using the mathematical equations of the algorithm to compute a unique or encrypted number. The number thus derived need not be protected against unauthorized use because it is unique, the derivation process is essentially irreversible, the algorithm is protected against unauthorized use, and the PIN is provided to the payee or account holder only.

Figure 1:
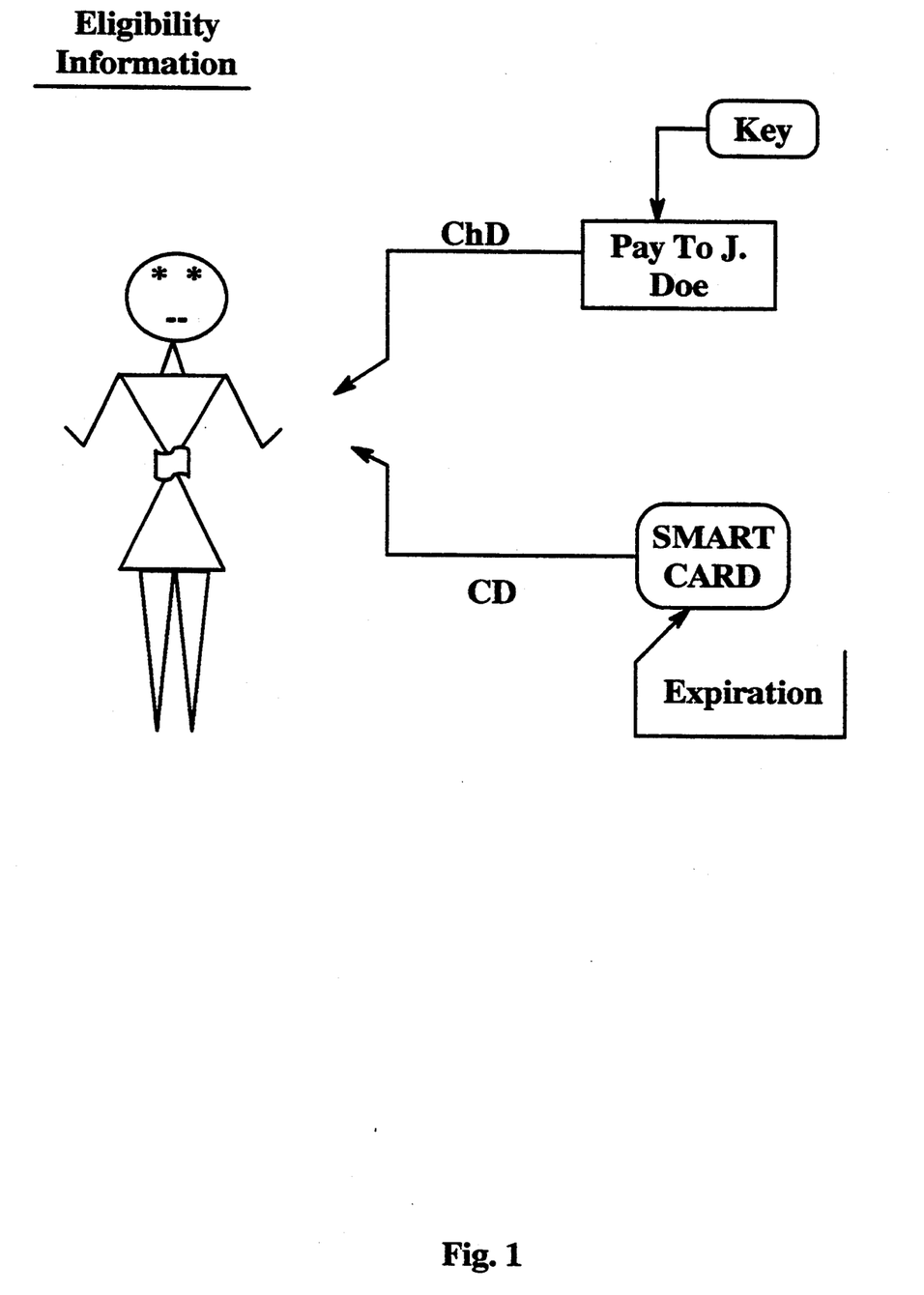
FIG. 1 is a diagram illustrating the multiple cross-checks employed in accordance with the present invention.

The various cross-checks performed by the present invention may be better understood with reference to FIG. 1. As explained, each payee is issued a smart card containing eligibility information for that payee. In the process of cashing the check, the smart card is inserted into a transaction terminal and the eligibility information read and displayed for reference by the person cashing the check. Should the information indicate that the individual is not in fact eligible for payment, the check will not be accepted. The smart card also contains an expiration date beyond which the card may not be used for check verification. To ensure that the card does in fact belong to the person attempting to use it, at the time of issuance of the card, the card holder's PIN is encrypted according to the algorithm contained in the card and the result, to be referred to as the "card derivation number" and represented as "CD" in the figures, is written to the card and/or terminal. When use of the card is attempted, the user must insert the card into a transaction terminal and enter his PIN, which is then encrypted according to the algorithm contained in the card and compared with the card derivation number. If the results do not match, then the card will be ejected and the transaction will not be permitted to proceed. Therefore, in addition to verifying the eligibility of the recipient, the system of the present invention also verifies the validity of the card presented by means of the expiration date recorded thereon and the validity of the relationship between the card and the card bearer by means of the card derivation number.

In similar fashion, the system of the present invention authenticates the check presented and validates the relationship between the check and the bearer by means of a check derivation number, represented in the figures as "ChD" number. Like the card derivation number, the check derivation number (or simply check derivation) involves encryption of the PIN. To render the system still more fool proof, the PIN of the named payee of the check is further combined with a secondary key prior to encryption. The key must appear on the face of the check and is preferably very transaction specific. Suitable keys might include the check sequence number or the amount of the check. Other possible keys include the payee's Social Security Number, employee number, or account number, a transaction number or a randomly generated number. The check derivation, computed from the PIN of the named payee and the secondary key appearing on the face of the check according to the algorithm contained in the card of the named payee, is also printed on the face of the check. When the check is presented, the secondary key, input by the person cashing the check, is combined with the PIN input by the recipient and is encoded according to the algorithm contained in the recipient's smart card to arrive at what should be the check derivation printed on the face of the check. If the computed check derivation and the check derivation printed on the face of the check do not match, then either the check is not authentic in that it bears the wrong key or the recipient is not the named payee in that his PIN is different from the PIN used to compute the original check derivation.

Figure 2A:
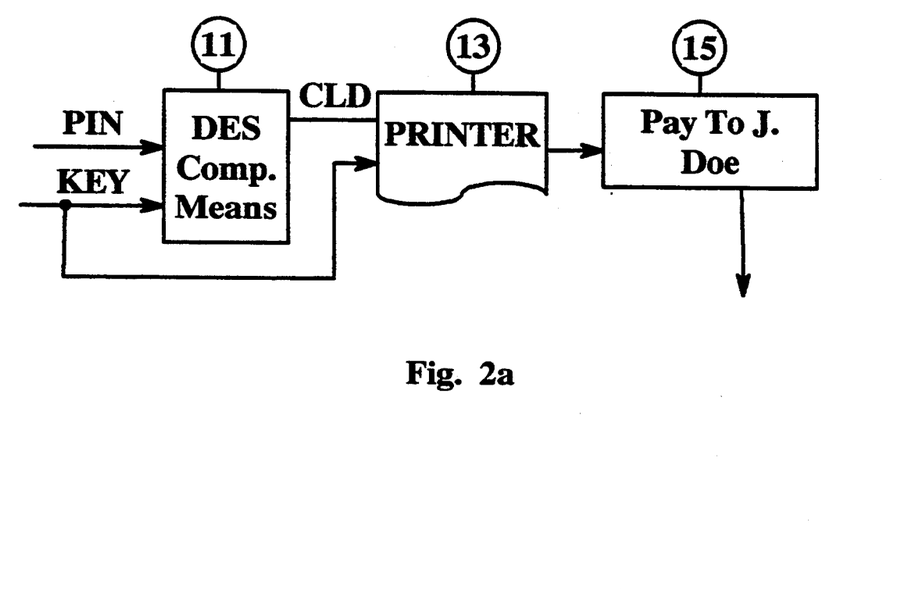
FIG. 2a is a block diagram representing part of the method of the present invention as applied at a point of origin of a check.
Figure 2B:
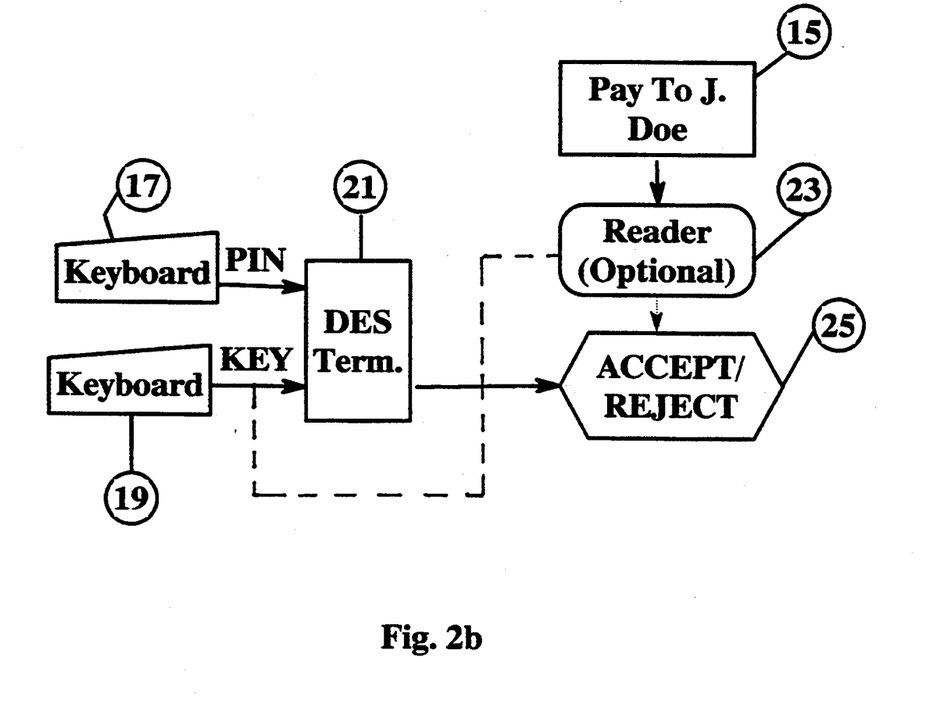
FIG. 2b is a block diagram representing another part of the method of the present invention as applied at a point of use of the check.

Referring to FIGS. 2a and 2b, a unique feature of the present invention is that the check derivation is developed both at the time the check is generated and at the time it is presented for payment. In FIG. 2a, the PIN previously assigned to or selected by the named payee and a secondary key appearing on the face of the check, such as the check number, are input to a computing means 11 that implements, for example, the Data Encryption Standard (DES) algorithm which encrypts the combination of the inputs to arrive at the check derivation, which is supplied to a printer 13 and printed on the face of the check 15. In some instances, for example if the check amount is used as the secondary key, then the secondary key will also be supplied to the printer to be printed on the face of the check.

By printing the check derivation on the face of the check, it is available for ready comparison with its independently generated counterpart at check cashing time as illustrated in FIG. 2b. In the most simple application of the present invention, the recipient inputs his/her PIN into a transaction terminal 21 by means of a keyboard 17, and the person cashing the check inputs the secondary key as read from the face of the check into the same terminal by means of a keyboard 19. The terminal independently generates the check derivation, and the two derived numbers may be manually read and compared. To expedite and simplify the transaction, however, provisions may also be made to record the check derivation on the face of the check in machine readable format such as bar code, MICR font or ECR font. The secondary key may be recorded in the same manner. Using a suitable reading device 23, generation and comparison of the two derived numbers may then be performed completely within the transaction terminal using a comparison unit 25.

The same encryption algorithm need not be used for all recipients. The only requirement is that for any recipient the algorithm used to calculate the check derivation during issue of the check must be the same algorithm as contained in the IC card of the named payee to be used at the time of cashing the check.

Besides developing the check derivation both at the time a check is generated and at the time it is presented for payment, another unique feature of the present invention is the addition of the secondary key as an input to the algorithm both when generating the check and when cashing it. The secondary key should be as unique to the specific transaction as possible and readily available to the check casher, preferably appearing on the face of the check. Although possibilities for the secondary key include Social Security Number, employee number, account number, transaction number, a randomly generated number, etc., the most logical choice for the secondary key may be the check number (usually sequential) used by the payor for check control purposes or the numerical amount of the check. Some payroll processing systems generate the check number in the payroll computer rather than having the check numbers pre-printed. As a result, the check number is already available to the computer when processing a check. The payor's computer system therefore inputs both the PIN and the check number or amount to the algorithm in a defined procedure in order to compute the check derivation which is then printed on the face of the check. The identical procedure is followed using the same algorithm in the card when the check is presented for payment. In this way, the check is validated as a one-time, free-standing instrument of payment and the check/payee relationship is validated.

Instead of using an IC card in conjunction with the present invention, a magnetic stripe card as currently used for accessing ATMs could be used. IC cards are preferred, however, for the following reasons. In the case of ATMs, the algorithm is contained in the equipment rather than in the card. It is anticipated, however, that the check verification system of the present invention will enjoy widespread use at a wide variety of terminal locations and with a wide variety of terminal types. Under such circumstances, standardization of the level that has been achieved by ATMs may not be attainable. By including the algorithm in a portable card, the algorithm may be used at remote points of use without any special provisions being required. The algorithm is simply carried by the user to the point of use. In addition, providing the algorithm in an IC card allows for much greater flexibility in changing and enhancing the features of the present invention.

Figure 3:
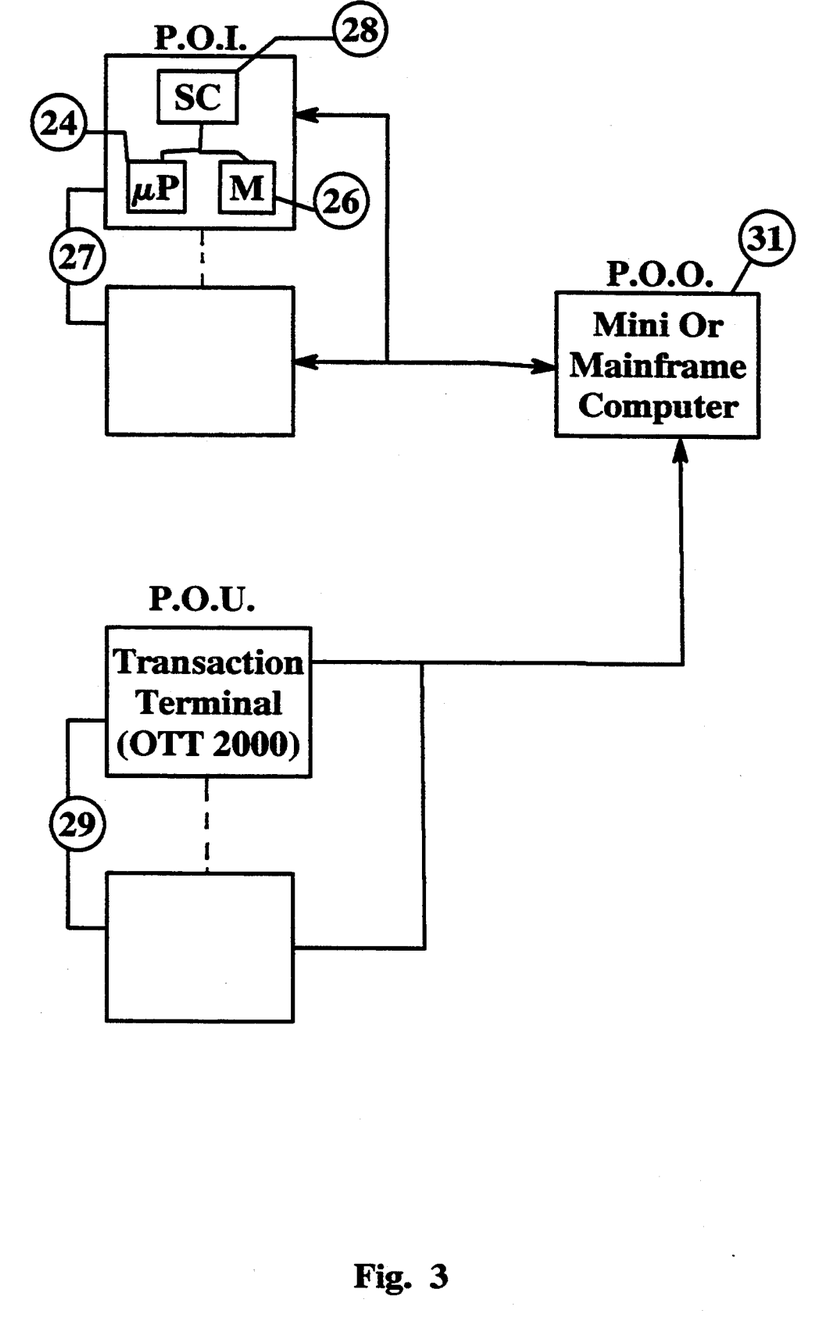
FIG. 3 is a block diagram illustrating the interaction between a point of issue of a check verification card, a point of origin of a check, and a point of use of the check in accordance with the present invention.

Referring now to FIG. 3, the checks of a particular payor will generally be issued from a central location or point of origin (P.O.O.), for example the site of a payroll computer 31 such as a minicomputer or mainframe computer. Enrollment of a recipient and issuance of a smart card, on the other hand, may take place at various separate locations, each referred to as a point of issue (P.O.I.). As shown in FIG. 3, the equipment at a point of issue 27 may consist of a simple terminal having a microcomputer 24, memory 26, and a smart card read/write peripheral device 28.

When a potential check recipient or current recipient is validated to receive checks through the system, he/she is entered into the payor's computer system if not already on file. That entry will include all pertinent information regarding the individual including an identification number, which will normally be a Social Security Number in the case of government checks or may be an employee number in the case of paychecks. Once a potential payee has been validated to receive checks and all data have been entered into the computer, he/she will be provided with a smart card. Eligibility information and the card derivation number are written to the card as previously described.

Checks may be accepted at a wide variety of locations, each of which will be referred to as a point of use (P.O.U.). Referring still to FIG. 3, each point of use is equipped with a transaction terminal 29. A wide variety of terminals is suitable for use with the present invention. An example of such a terminal is the OKI Advanced Transaction Terminal OTT 2000. The transaction terminals at the points of use need not be connected to the point of origin in order to perform check verification. It may be desirable, however, to periodically or daily connect the points of use to the point of origin for purposes of data capture. A transaction terminal will typically have the capability of total and automatic data capture at the time a check is cashed or on demand. By forwarding such information to the point of origin, a wide range of data susceptible to statistical analysis may be made available for use by the payor. Such data may include the identification of the payee, the identification of the check casher, the identification of the transaction terminal, the time, place and date of check cashing, the amount of payment used for merchandise purchase, the type of merchandise purchased, etc.

According to the system as heretofore described, the smart card functions in the system only as a positive identifier and a storer of check cashing parameters. No transaction data is handled other than that required to ensure that the limits defined by the parameters are not exceeded. Preferably, these parameters may also be altered and updated by downloading new parameters from a secured database at the point of origin to a point of issue.

Such a system, however, would barely scratch the surface in terms of exploiting the capabilities of the IC processor cards currently available. By further exploiting the capabilities of the smart card to implement further features, significant gains in economy and convenience may be achieved. For example, when a payee presents a check for cashing, it will often be done in conjunction with merchandise purchases. It may also be done in conjunction with a banking transaction for those who have bank accounts. In either event, it will usually be the case that there is a remaining balance subject to deposit, albeit short term, or for return as cash. The smart card provides the alternative of "depositing" that remainder into the card as an electronic entitlement which is available to the card holder on demand and which is protected in the meantime by the PIN. Assuming responsibility as the clearing house for such accounts would be attractive to a bank or other financial services institution, because it would be able to collect immediately for the checks when cashed and presented, it would have the use of the funds as represented by the electronic entitlement in the card just as it does with DDA accounts today but with practically none of the administrative costs, and the validity of the checks would be assured as already described.

As smart card read/write terminals become more readily available, a dramatic shift in the handling of electronic entitlement types of funds may be expected. The payor, particularly in the case of the Government, will arrange for the checks and the transactions involving the electronic entitlement in the card to pass through a clearing process on a handling fee basis only and will "cover" the originally issued checks only as these funds are used, not as checks are cashed. It is not unusual today for an employer to issue and deliver checks to employees, but to deposit the funds necessary to cover the checks only on a schedule as experience indicates the funds will be required. This practice will still be available as a way to manage funds where an employer or third party assumes responsibility for the entitlement in the card. However, the payee will have immediate elective use of the funds without having to "play the float" in order to get at funds that are legitimately his/hers but are actually not yet available.

Figure 4:
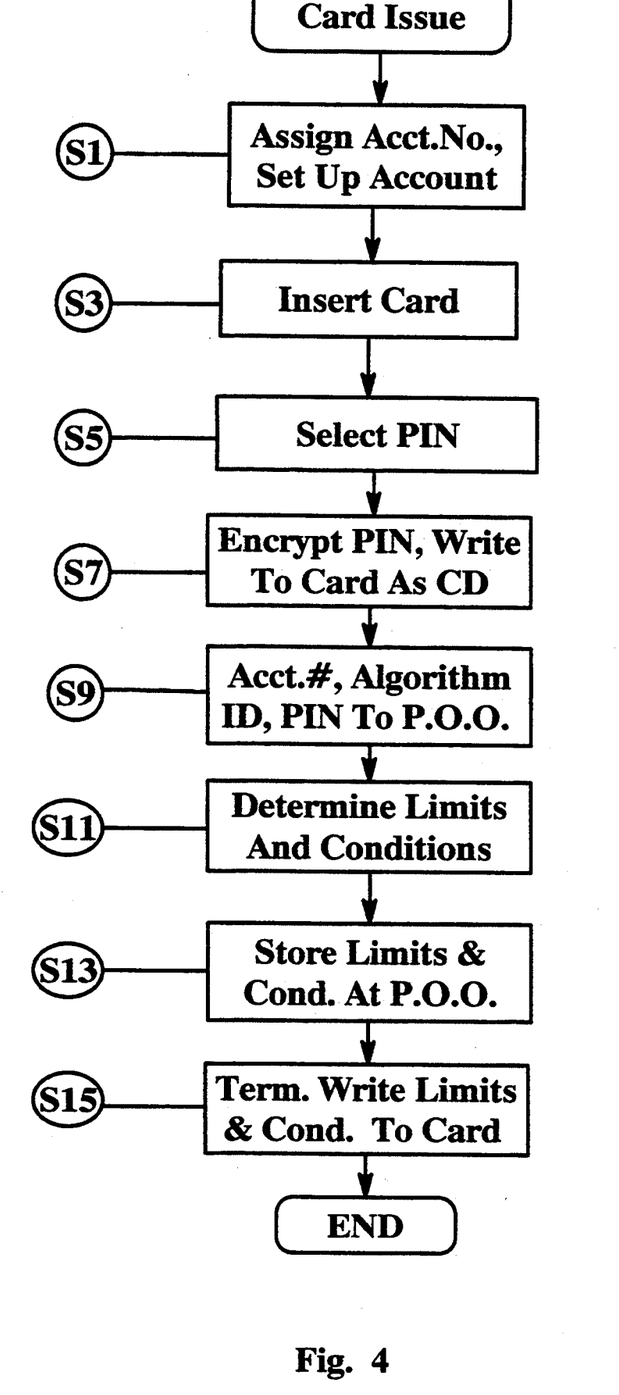
FIG. 4 is a flowchart of the card issuance process according to the present invention.

With respect to FIG. 3, the various steps involved in issuing a card at a point of issue, issuing a check at the point of origin, and cashing a check at a point of use, will be described with reference to FIGS. 4, 5, and 6, respectively. Referring first to FIG. 4, if an account for a recipient has not previously been set up, then an account number is assigned and the account is set up (Step S1). An unused smart card is then inserted into the smart card read/write terminal (Step S3). The recipient then selects or is assigned a PIN (Step S5). The PIN is thereafter encrypted according to an algorithm stored in the card to produce the card derivation number, which is stored in the card (Step S7). The account number, the PIN, and the identity of the algorithm stored in the card are then forwarded to the point of origin (Step S9), where personnel determine the limits and conditions of dispersal to the recipient (Step S11). These limits and conditions are stored at the point of origin (Step S13) and sent to the point of issue terminal, where they are written into the card (Step S15). All necessary steps have then been taken to verify future check transactions involving the recipient.

Figure 5:
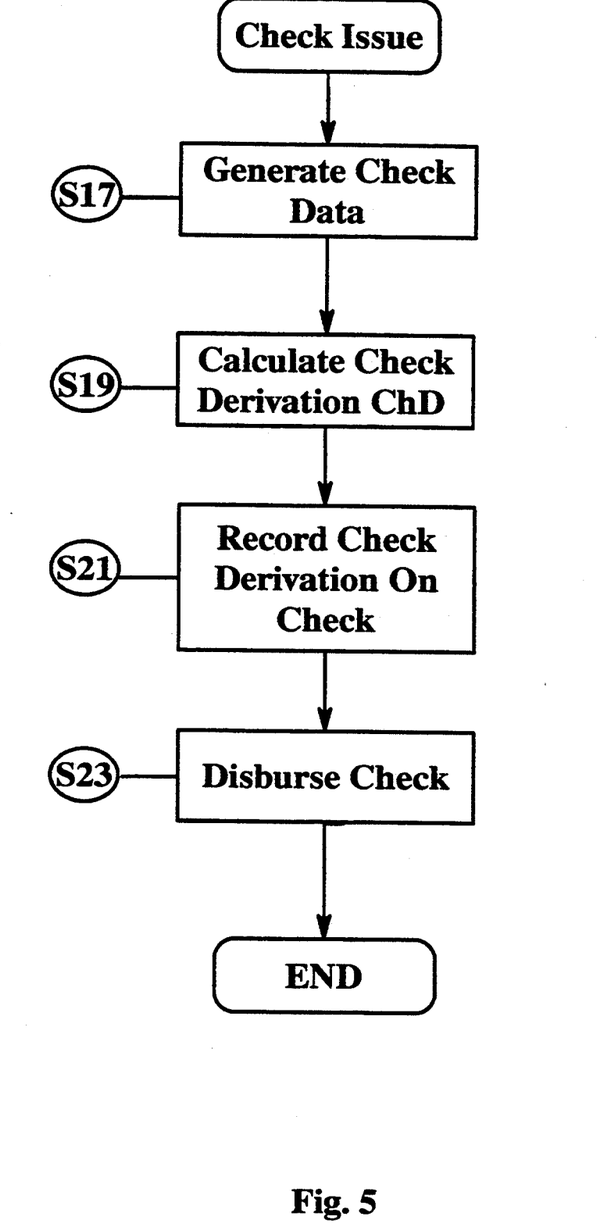
FIG. 5 is a flowchart of the check issuance process according to the present invention.

Referring to FIG. 5, when a check is issued at the point of origin, the usual check data are generated such as the name of the payee and the amount of the check (Step S17). The check derivation is then calculated (Step S19) in accordance with the PIN stored for the recipient and the secondary key such as the check number or amount of a check using the algorithm previously identified as being the algorithm stored in the recipients smart card. The check derivation is then recorded on the face of the check (Step S21), and the check is disbursed (Step S23).

Figure 6A:
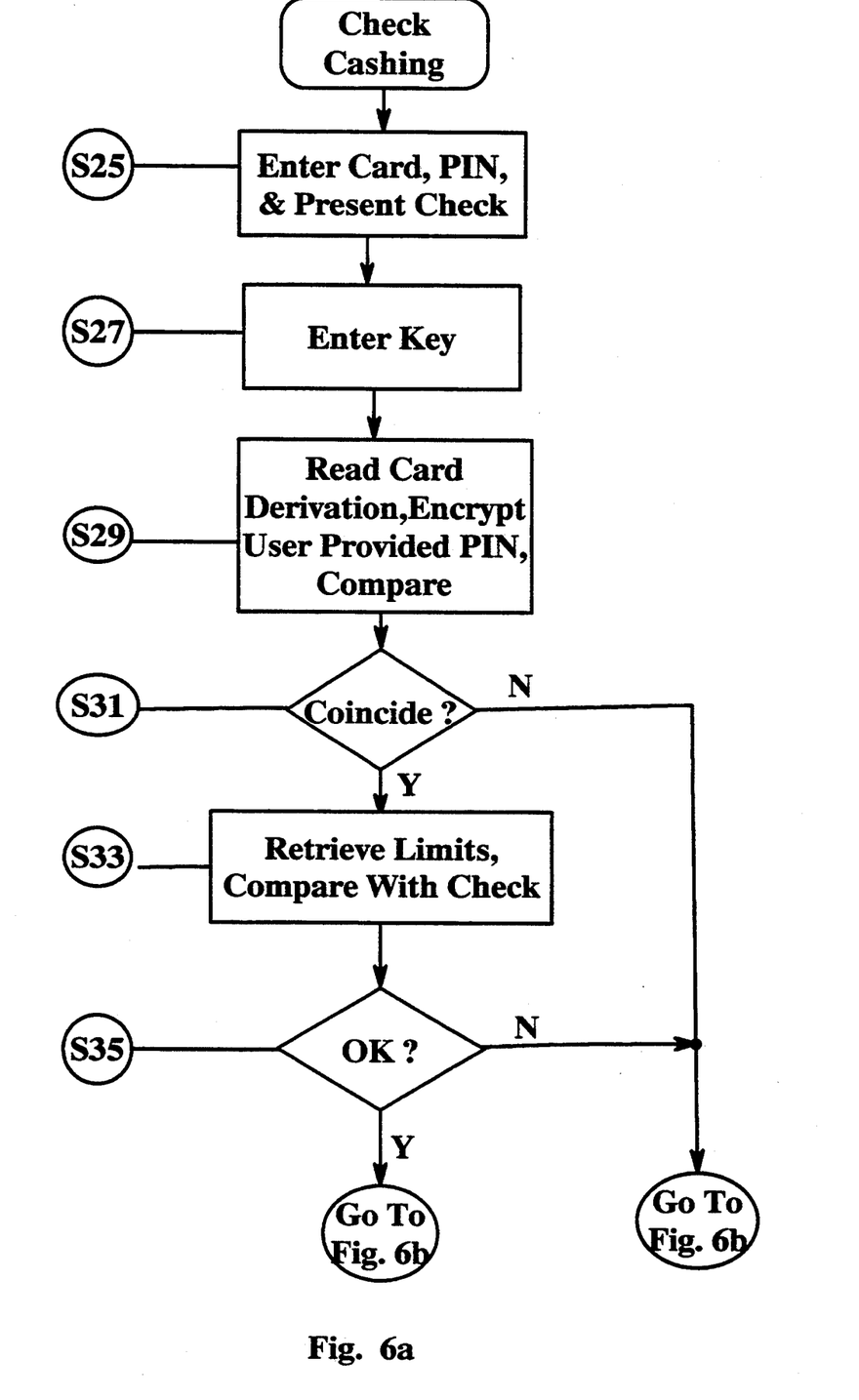
FIGS. 6a and 6b, is a flowchart illustrating the check cashing process according to the present invention.
Figure 6B:
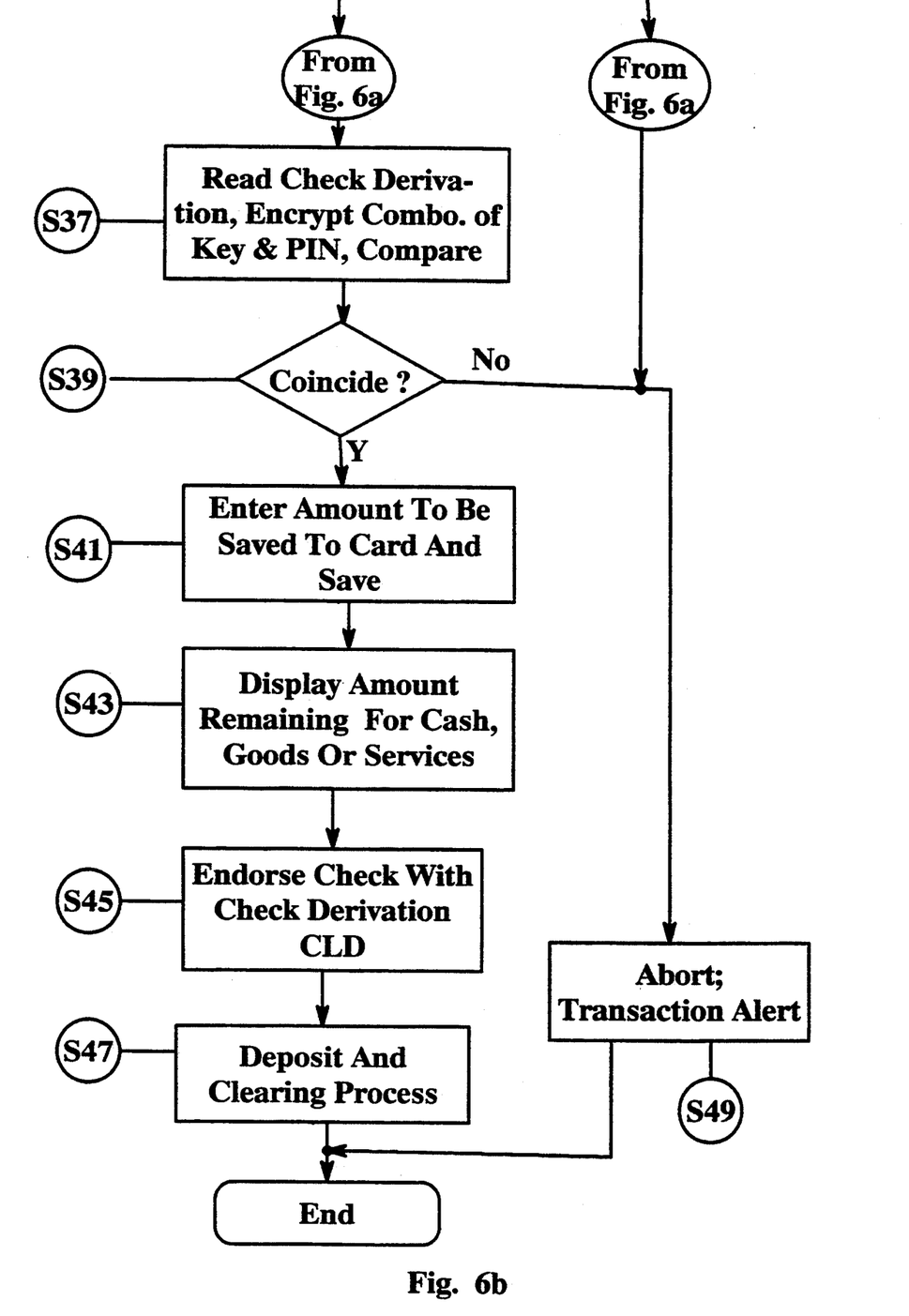

Referring to FIG. 6a, when the recipient goes to cash the check, he first inserts his smart card and enters his PIN into the transaction terminal and presents the check to the casher (Step S25). The check may then either be placed in a machine reader if available to read the card derivation number and the secondary key, or the secondary key may be entered manually by the casher (Step S27). The combination of the user-provided PIN and the secondary key is then encrypted and the results are compared with the card derivation number appearing on the front of the check (Step S29). If the results do not coincide as determined in Step S31, then the transaction terminal alerts the casher and the transaction is aborted (Step S49). If the results do coincide, then the eligibility limits of the recipient stored in the smart card are retrieved and displayed for comparison with the check (Step S33). If the check is within the eligibility limits as determined in Step S35, then the transaction proceeds. Otherwise, the casher aborts the transaction. Finally, the check derivation is read, and a combination of the userprovided PIN and the secondary key is encrypted and compared with the check derivation (Step S37). If the results coincide as determined in Step S39, then the transaction may proceed; otherwise, the transaction is aborted. If the transaction is allowed to proceed, then the transaction has been verified, and the user enters an amount of funds to be saved to the smart card, which are thereupon saved (Step S41). The amount of funds remaining for cash, goods, or services is thereafter displayed (Step S43). Once the transaction has been completed, the transaction terminal endorses the check on the back, including the check derivation and the endorsement (Step S45). The security of this system would provide the check issuer with the control necessary to guarantee payment to the check casher upon a proper endorsement. Thereafter, the check is placed in the deposit and clearing process in the normal process (Step S47).

While it is generally understood that smart cards provide the capability of eliminating paper checks completely, checks will likely remain the primary vehicle for disbursing funds to individuals for the foreseeable future. The check verification system of the present invention with its multiple cross-checks provides the necessary security to essentially eliminate the weaknesses of a major portion of the paper check system. The system of the invention will also find application to other paper instruments or documents susceptible to falsification, including, for example, security documents, ambassadors' pouches and their contents, etc.

It will be appreciated by those of ordinary skill in the art that the present invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

What is claimed is:

1. A method in which the holder of a document is identified by a personal identifier represented in numerical form and is issued a dam-beating card, comprising the steps of:
   recording a personal-identifier-related card derivation number on said data-beating card;
   applying a data encryption algorithm to said personal identifier and to a further number together to produce a document derivation number;
   recording said document derivation number on said document, said further number also being recorded on said document;
   reading said card derivation number from a data-bearing card presented when said document is being negotiated;
   ascertaining a personal identifier from a bearer of said document;
   using said personal identifier as ascertained from said bearer, producing a personal-identifier-related card derivation number and comparing the same with said card derivation number read from said data beating card; and
   applying a data encryption algorithm to said personal identifier as ascertained from said bearer and to said further number together to produce a document derivation number and comparing the same with said document derivation number recorded on said document.

2. The method of claim 1, wherein said document is a check and said further number is a check number.

3. The method of claim 1, wherein said document is a check and said further number is a check amount.

4. The method of claim 1, wherein said further number is a Social Security Number of said holder.

5. The method of claim 1, wherein said document derivation number is recorded on said document in machine-readable form.

6. The method of claim 1, comprising the further step of recording said data encryption algorithm on said databearing card.

7. The method of claim 7, comprising the further step of recording eligibility and expiration information on said data-bearing card.

8. The method of claim 7, wherein said data-bearing card is an IC card.

9. The method of claim 8, comprising the further step of, if the two document derivation numbers do coincide, printing document along with an indication that said document has been validated.

10. The method of claim 9 wherein said document is a check, comprising the further steps of:
    accepting said check at least partly in exchange for goods or services, and
    crediting any unused amount of said check to a balance recorded on said IC card.

11. The method of claim 10, comprising the further step of:
    capturing transaction data concerning said exchange; and
    relaying said transaction data to a collection point.

12. The method of claim 11, further comprising the step of statistically analyzing said transaction data.

13. A method in which the holder of a document is identified by a personal identifier represented in numerical form and is issued a data-bearing card, comprising the steps of:
    recording expiration date and eligibility information on said data-bearing card;
    applying a data encryption algorithm to said personal identifier and to a further number together to produce a document derivation number;
    recording said document derivation number on said document, said further number also being recorded on said document;
    reading and displaying said expiration date and eligibility information from a dambearing card presented when said document is being negotiated;
    ascertaining a personal identifier from a bearer of said document; and
    applying a data encryption algorithm to said personal identifier as ascertained from said bearer and to said further number together to produce a document derivation number and comparing the same with said document derivation number recorded on said document.

* * * * *